United States Patent
Tanaka et al.

[11] Patent Number: 5,256,494
[45] Date of Patent: Oct. 26, 1993

[54] SLIDING MEMBER WITH A SINTERED COPPER ALLOY LAYER

[75] Inventors: Tadashi Tanaka, Konan; Masaaki Sakamoto, Nagoya; Koichi Yamamoto, Komaki; Tsukimitsu Higuchi, Kani, all of Japan

[73] Assignee: Daido Metal Company Ltd., Nagoya, Japan

[21] Appl. No.: 798,442

[22] Filed: Nov. 26, 1991

[30] Foreign Application Priority Data

Nov. 29, 1990 [JP] Japan .................................. 2-333283

[51] Int. Cl.$^5$ .............................................. B22F 7/04
[52] U.S. Cl. ..................................... 428/552; 428/548; 428/551; 428/565; 428/615; 428/674; 428/676; 428/677; 75/231; 75/244; 75/246; 75/247
[58] Field of Search ............... 428/547, 548, 551, 552, 428/565, 615, 674, 676, 677; 75/231, 244, 246, 247; 419/8, 10, 35, 45, 69; 427/404, 405; 429/547, 548, 551, 552, 565, 615, 674, 676, 677

[56] References Cited

U.S. PATENT DOCUMENTS

| 3,453,103 | 7/1969 | Tracey et al. | 75/201 |
| 4,334,926 | 6/1982 | Futamura et al. | 75/230 |
| 4,406,857 | 9/1983 | Mahrus et al. | 420/474 |
| 4,505,987 | 3/1985 | Yamada et al. | 428/553 |
| 4,579,712 | 4/1986 | Mori | 419/9 |
| 4,627,959 | 12/1986 | Gilman et al. | 419/61 |
| 4,818,628 | 4/1989 | Alexander et al. | 428/561 |
| 4,999,257 | 3/1991 | Imai | 428/555 |
| 5,041,339 | 8/1991 | Mori et al. | 428/552 |
| 5,126,212 | 6/1992 | Yamada et al. | 428/547 |

FOREIGN PATENT DOCUMENTS 63-241131 10/1988 Japan .
1-198407  8/1989 Japan .
2-118002  5/1990 Japan .

OTHER PUBLICATIONS

Derwent Abstract No. 89-273950/38, JP 01198407-A, Aug. 10, 1989.
Derwent Abstract No. 88-326942/46, JP 63241131-A, Oct. 6, 1988.
Derwent Abstract No. 90-181533/24, JP 02118002-A, May 2, 1990.

Primary Examiner—Donald P. Walsh
Assistant Examiner—Chrisman D. Carroll
Attorney, Agent, or Firm—Browdy and Neimark

[57] ABSTRACT

The sliding member of the invention comprises a steel backing and a sintered Cu-alloy layer mounted integrally on one surface of the backing metal, wherein the sintered Cu-alloy comprises 1 to 15% Sn, 1 to 20% Ni-B compound, 1% or less phosphorus, and the balance of Cu and impurities. Cu-alloy may further contain 1 to 30% Pb and/or 0.5 to 8% graphite. Pb and graphite provide the sliding alloy layer with good lubrication property. Preferably the Ni-B compound is used, which is composed of 7 to 15% B and the balance of Ni and impurities.

17 Claims, No Drawings

SLIDING MEMBER WITH A SINTERED COPPER ALLOY LAYER

BACKGROUND OF THE INVENTION

The present invention relates to a composite sliding member to be preferably used as bushes and washers in automobiles, industrial machines, agricultural machines, and the like. More specifically, the present invention relates to a composite sliding member exhibiting greater wear resistance in the boundary lubrication condition of a severe lubricating condition.

Sintered copper alloys such as bronze, lead bronze and graphite-containing bronze have been used principally in the bushes, washers and the like described above. These alloys exhibit good sliding performance under the condition of use when a lubrication oil is present. However, such alloys are poor particularly in wear resistance in a boundary lubrication region, so sliding performance has not satisfactorily been obtained.

SUMMARY OF THE INVENTION

The present invention has been achieved on such technical background. A primary object of the present invention is to provide a sliding member having a sintered copper alloy layer with improved wear resistance under the boundary lubrication condition.

According to the invention, a hard Ni-B compound is added in the sintered copper alloy. The sliding members of the invention are provided in the following forms:

a. A sliding member comprising a backing steel and a sintered copper alloy layer mounted integrally on one surface of the backing metal, wherein the sintered copper alloy comprises, by weight, 1 to 15% Sn, 1 to 20% Ni-B compound, 1% or less P, and the balance of Cu and impurities.

b. A sliding member comprising a backing steel and a sintered copper alloy layer mounted integrally on one surface of the backing metal, wherein the sintered copper alloy is composed of, by weight, 1 to 15% Sn, 1 to 20% Ni-B compound, 1 to 30% Pb, 1% or less P, and the balance of Cu and impurities.

c. A sliding member comprising a backing steel and a sintered copper alloy layer mounted integrally on one surface of the backing metal, wherein the sintered copper alloy is composed of, by weight, 1 to 15% Sn, 1 to 20% Ni-B compound, 0.5 to 8% graphite, 1% or less P, and the balance of Cu and impurities.

d. A sliding member comprising a backing steel and a sintered copper alloy layer mounted integrally on one surface of the backing metal, wherein the sintered copper alloy is composed of, by weight, 1 to 15% Sn, 1 to 20% Ni-B compound, 1 to 30% Pb, 0.5 to 8% graphite, 1% or less P, and the balance of Cu and impurities.

It is preferable to use a Ni-B compound of which chemical composition is 7 to 15 wt. % B and the balance of Ni and impurities, while as the backing steel plate, those with no surface treatment or the steel plate with a copper plating or with copper alloy plating can be used.

DETAILED DESCRIPTION OF THE INVENTION

There will now be explained the reason to limit the content of each alloying element in the sintered copper alloys.

Sn (1 to 15%): Tin dissolves in copper as to produce a solid solution and strengthen the matrix. At tin content less than 1%, the alloy is insufficient in strength and poor in wear resistance. At tin content above 15%, the alloy becomes brittle.

Graphite (0.5 to 8%): Graphite exhibits a lubrication function as a component having a self lubrication property in the metal to metal contact condition in which no lubricant film is formed. At graphite content less than 0.5%, the lubrication function is insufficient, while at the content above 8%, the alloy strength is deteriorated extremely.

Ni-B compound (1 to 20%): It is preferably used a Ni-B compound consisting of 7 to 15% B and the balance of nickel and impurities. The hardness is above HV 1000 or more. The Ni-B compound disperses in the copper alloy and improves the wear resistance. At boron content of less than 7% in the compound, elemental nickel co-exists besides the Ni-B compound, which is unsuitable as a wear resistant material. At boron content above 15%, elemental boron co-exists besides the Ni-B compound, which deteriorates the sintering property of the copper alloy. At the content of Ni-B compound less than 1%, less effect is obtained on the improvement of wear resistance. At the content above 20%, the alloy becomes brittle and also incurs abrasive wear in a mating sliding member.

P (1% or less): Phosphorus in a level of 1% or less is added in the alloy in order to improve the wear resistance and the sintering properties. At phosphorus content above 1%, the toughness is deteriorated among mechanical properties.

Pb (1 to 30%); Lead exhibits a good lubrication function as a soft component. In case that a lubricant oil is present, lead also exhibits a lubrication function as a component of having a good affinity to oil. At lead content less than 1%, the lubrication function is insufficient. At the content above 30%, the alloy strength is deteriorated and thus the alloy is unsuitable as a sliding member.

EXAMPLE

Each of the alloy powders as samples 1 to 12 shown in Table 1 was laid on a steel plate with a copper plating layer previously plated on the surface thereof, and then was heated at a temperature of 700° to 900° C. in a furnace under a hydrogen atmosphere for 10 to 30 minutes in order to sinter the powder on the steel plate. A rolling and a resintering treatments were effected one after another on the composite member obtained by the first sintering treatment. The rolling is effected in order to press a sintered copper alloy layer to a high density so that a composite member with a predetermined thickness is obtained. The term "resintering treatment" means a treatment to make a previously sintered copper alloy layer strengthen by heating in a furnace under hydrogen atmosphere at a temperature of 700° to 900° C. for 10 to 30 minutes. Each of the composite sliding members thus obtained had a size of a total thickness of 2.2 mm, 0.6 mm thickness of a sintered copper alloy layer and a width of 100 mm.

Samples 1 to 8 are the composite sliding members of the invention. Samples 9 to 12 are conventional composite sliding members. Table 1 shows chemical compositions of powders used as raw materials.

Mechanical properties (hardness, tensile strength and bonding strength of a backing steel between a sintered alloy layer) and a wear performance of each of the sliding members were examined. The results are shown in Tables 2 and 3. Table 4 shows the condition of wear test.

TABLE 1

| Types | Samples No. | Powder used | Chemical composition (wt. %) | | | | | |
|---|---|---|---|---|---|---|---|---|
| | | | Cu | Sn | Pb | Ni—B | Graphite | P |
| Invention alloy | 1 | Lead-bronze and | Bal. | 3.3 | 22 | 5.5 | — | 0.02 |
| | 2 | Ni—B compound | Bal. | 3.0 | 20 | 15 | — | 0.02 |
| | 3 | (11% B and the bal. Ni) | Bal. | 3.5 | 23 | 1.5 | — | 0.02 |
| | 4 | Lead-bronze, | Bal. | 3.3 | 22 | 5.5 | 1 | 0.02 |
| | 5 | Ni—B compound | Bal. | 10 | 10 | 1.5 | 8 | 0.02 |
| | 6 | and graphite (11% B and the bal. Ni) | Bal. | 10 | 5 | 15 | 4 | 0.02 |
| | 7 | Bronze, Ni—B | Bal. | 10 | — | 3 | 4 | 0.2 |
| | 8 | compound and graphite | Bal. | 10 | — | 13 | 4 | 0.2 |
| Conventional alloy | 9 | Lead-bronze | Bal. | 10 | 10 | — | — | 0.05 |
| | 10 | | Bal. | 3.5 | 23 | — | — | 0.02 |
| | 11 | Bronze and | Bal. | 10 | — | — | 4 | 0.2 |
| | 12 | graphite | Bal. | 10 | — | — | 8 | — |

TABLE 2

| Types | Samples No. | Hardness of Alloy Layer (Hv) | Mechanical Strength | |
|---|---|---|---|---|
| | | | Tensile Strength (kg/mm$^2$) | Bonding Strength between Backing Steel and Alloy Layer (kg/mm$^2$) |
| Invention alloy | 1 | 58 | 16 | 13 |
| | 2 | 65 | 17 | 14 |
| | 3 | 51 | 15 | 12 |
| | 4 | 53 | 13 | 10 |
| | 5 | 40 | 8 | 6 |
| | 6 | 63 | 16 | 13 |
| | 7 | 76 | 13 | 10 |
| | 8 | 80 | 20 | 17 |
| Conventional alloy | 9 | 73 | 24 | 18 |
| | 10 | 48 | 14 | 11 |
| | 11 | 57 | 11 | 9 |
| | 12 | 35 | 5 | 3 |

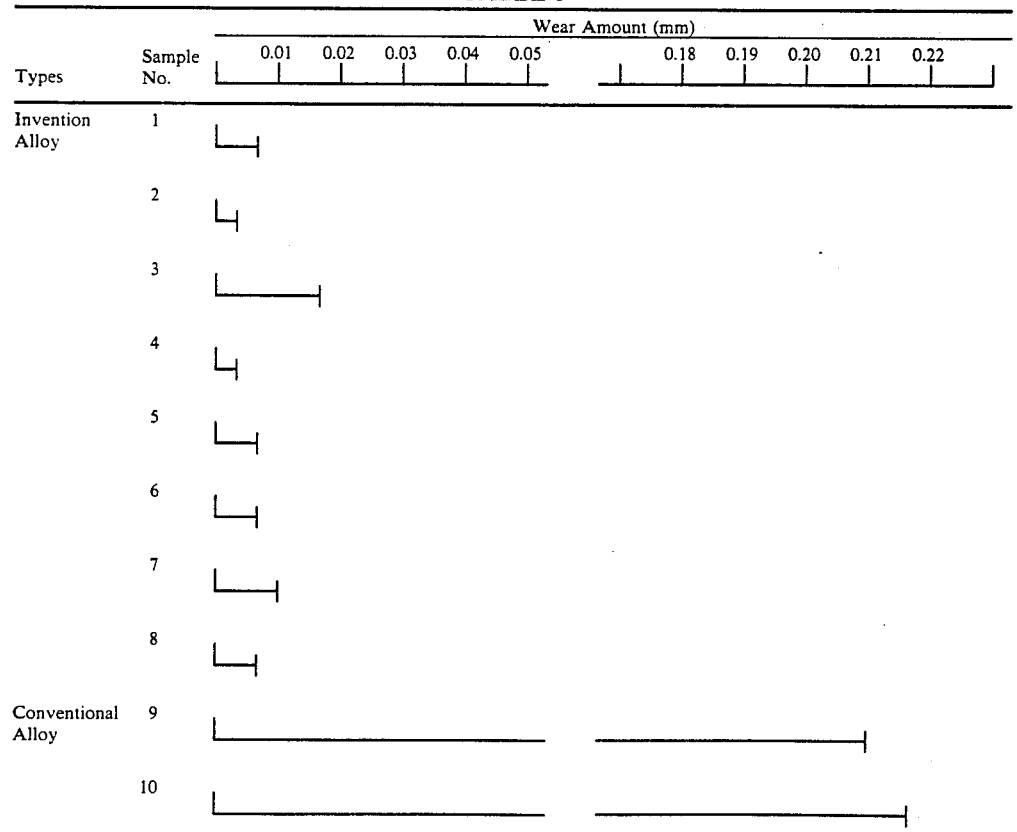

TABLE 3

TABLE 3-continued

| Types | Sample No. | Wear Amount (mm) 0.01 0.02 0.03 0.04 0.05 ... 0.18 0.19 0.20 0.21 0.22 |
|---|---|---|
| | 11 | |———————————————| |
| | 12 | |———————————————| |

TABLE 4

| Test Condition | Unit |
|---|---|
| 1. Loading at A Bush End | 250 kgf |
| 2. Rotation Speed of Shaft at Surface | 0.26 m/sec |
| 3. Rotation Number of Shaft | 250 rpm |
| 4. Driving of Shaft | Intermittent Repetition of Rotation and Stop: Each 30 sec |
| 5. Lubricant Oil | Kerosene — |
| 6. Oil Supply | 20 to 30 ml/min. |
| 7. Oil Temperature at A Discharge Port | 55 to 65° C. |
| 8. Inner Diameter of Bush × Width | 20 × 15.5 mm |
| 9. Shaft Material | JIS S55C — (hardened by quenching) |
| Roughness | $R_{max}$ 1.0 μm |
| Hardness | 650 Hv |
| 10. Diameter Clearance | 0.028 to 0.040 mm |

EVALUATION OF THE TEST RESULTS

Comparing the results of the wear test shown in Table 3 concerning the conventional alloy No. 10 and the invention alloy No. 1, the both having similar compositions, it is understood that the wear loss of the latter (No. 1), containing 5.5 wt. % of the Ni-B compound, is about 1/30 against that of the former (No. 10).

Comparing also the conventional alloy No. 11 and the invention alloy No. 7, it is understood that the wear loss of the latter (No. 7) containing 3 wt. % of the Ni-B compound is about 1/7 against that of the former (No. 11). This indicates that the addition of the Ni-B compound remarkably improves wear resistance.

As will be apparent from the above, the sliding members of the present invention each comprising a sintered copper alloy layer have a good wear resistance property due to containing the Ni-B compound in the copper alloy layer, comparing with those of conventional bronze, lead bronze, graphite-containing bronze and the like.

What is claimed is:

1. A sliding member comprising a backing steel and a sintered copper alloy layer mounted integrally on one surface of the backing steel wherein the sintered copper consists essentially of, by weight, 1 to 15% Sn, 1 to 20% Ni-B compound containing 7 to 15% boron, 1% or less phosphorous, and the balance of Cu and impurities.

2. A sliding member comprising a backing steel and a sintered copper alloy layer mounted integrally on one surface of the backing steel wherein the sintered copper consists essentially of, by weight, 1 to 15% Sn, 1 to 20% Ni-B compound containing 7 to 15% boron, 1 to 30%, 1% or less phosphorous, and the balance of Cu and impurities.

3. A sliding member comprising a backing steel and a sintered copper alloy layer mounted integrally on one surface of the backing steel wherein the sintered copper consists essentially of, by weight, 1 to 15% Sn, 1 to 20% Ni-B compound containing 7 to 15% boron, 0.5 to 8% graphite, 1% or less phosphorous, and the balance of Cu and impurities.

4. A sliding member comprising a backing steel and a sintered copper alloy layer mounted integrally on one surface of the backing steel wherein the sintered copper consists essentially of, by weight, 1 to 15% Sn, 1 to 20% Ni-B compound containing 7 to 15% boron, 1 to 30% Pb, 0.5 to 8% graphite, 1% or less phosphorous, and the balance of Cu and impurities.

5. A sliding member according to claim 1 wherein the Ni-B compound is composed of 7 to 15 wt. % B and the balance of Ni and impurities.

6. A sliding member according to claim 1, wherein a copper or copper-alloy layer is previously plated on at least one surface of the backing steel to which the sintered copper alloy layer is formed.

7. A sliding member according to claim 1 wherein the sintered copper alloy comprises, by weight 3 to 10% Sn, 1.5 to 15% Ni-B compound, 0.02 to 0.2% phosphorus, and the balance of Cu and impurities.

8. A sliding member according to claim 2, wherein the sintered copper alloy is composed of, by weight, 3 to 10% Sn, 1.5 to 15% Ni-B compound, 5 to 23% Pb, 0.02 to 0.2% phosphorus, and the balance of Cu and impurities.

9. A sliding member according to claim 3 wherein the sintered copper alloy comprises, by weight 3 to 10% Sn, 1.5 to 15% Ni-B compound, 1 to 8% graphite, 0.02 to 0.2% phosphorus, and the balance of Cu and impurities.

10. A sliding member according to claim 4, wherein the sintered copper alloy is composed of, by weight, 3 to 10% Sn, 1.5 to 15% Ni-B compound, 5 to 23% Pb, 1 to 8% graphite, 0.02 to 0.2% phosphorus, and the balance of Cu and impurities.

11. A sliding member according to claim 7, wherein the Ni-B compound is composed of 7 to 15 wt. % B and the balance of Ni and impurities.

12. A sliding member according to claim 8, wherein the Ni-B compound is composed of 7 to 15 wt. % B and the balance of Ni and impurities.

13. A sliding member according to claim 9, wherein the Ni-B compound is composed of 7 to 15 wt. % B and the balance of Ni and impurities.

14. A sliding member according to claim 10, wherein the Ni-B compound is composed of 7 to 15 wt. % B and the balance of Ni and impurities.

15. A sliding member according to claim 2, wherein a copper or copper-alloy layer is previously plated on at least one surface of the backing steel to which the sintered copper alloy layer is formed.

16. A sliding member according to claim 3, wherein a copper or copper-alloy layer is previously plated on at least one surface of the backing steel to which the sintered copper alloy layer is formed.

17. A sliding member according to claim 4, wherein a copper or copper-alloy layer is previously plated on at least one surface of the backing steel to which the sintered copper alloy layer is formed.

* * * * *